United States Patent [19]

Obergfell

[11] 4,266,437

[45] May 12, 1981

[54] BALL SCREW AND NUT ASSEMBLY

[75] Inventor: Bruno Obergfell, Wolfschlugen, Fed. Rep. of Germany

[73] Assignee: Warner Electric Brake & Clutch Company, South Beloit, Ill.

[21] Appl. No.: 35,818

[22] Filed: May 4, 1979

[30] Foreign Application Priority Data

Jan. 31, 1979 [DE] Fed. Rep. of Germany ....... 2903630

[51] Int. Cl.³ ............................................ F16H 29/20
[52] U.S. Cl. ................................ 74/424.8 R; 74/89.15
[58] Field of Search ................. 74/424.8 R, 424.8 NA, 74/216.3, 89.15, 424.8 A, 424.8 B; 85/32 R; 151/69

[56] References Cited

U.S. PATENT DOCUMENTS

| | | | |
|---|---|---|---|
| 1,346,997 | 7/1920 | Van Berkel | 74/424.8 A |
| 2,497,424 | 2/1950 | Terdina et al. | 74/424.8 R |
| 2,504,018 | 4/1950 | Gibson et al. | 74/424.8 R |
| 2,623,403 | 12/1952 | Terdina | 74/424.8 R |
| 3,221,118 | 11/1965 | Hoover | 74/424.8 R |
| 3,732,744 | 5/1973 | Rowland | 74/424.8 R |

*Primary Examiner*—C. J. Husar
*Assistant Examiner*—Conrad Berman
*Attorney, Agent, or Firm*—Leydig, Voit, Osann, Mayer & Holt, Ltd.

[57] ABSTRACT

A ball screw nut assembly of the type in which a nut having an internal helical groove is telescoped over a shaft having an opposing helical groove and an endless train of balls is disposed in the grooves so that the nut travels axially along the shaft as the latter is turned relative to the nut. Travel of the nut along the shaft is limited by a stop which is mounted on the shaft and engaged by the nut. As the nut approaches the stop, the balls leave the groove in the shaft and roll on a cylindrical portion of the shaft whereby the nut is no longer positively driven and the force with which the nut impacts the stop is substantially reduced. Return of the balls into the groove on the shaft is aided by making the diameter of the cylindrical portion slightly greater than the root diameter of the shaft grooves and by utilizing a resilient stop.

5 Claims, 2 Drawing Figures

BALL SCREW AND NUT ASSEMBLY

BACKGROUND OF THE INVENTION

The present invention relates to a ball screw assembly of the type in which a nut having an internal helical groove is telescoped over an elongated shaft having an opposing helical groove and an endless train of balls is disposed in the grooves so that the nut travels axially along the shaft as the latter is turned relative to the nut. The invention is particularly concerned with an assembly which utilizes a stop acting between the shaft and the nut to limit the travel of the nut to a position in which the stop is engaged. In some applications, the kinetic energy of the nut and any parts it may carry is of such a magnitude that the force of impact against the stop may be great enough to have a detrimental effect.

SUMMARY OF THE INVENTION

The general object of the invention is to provide a new and improved ball screw and nut assembly of the foregoing type in which the positive drive of the nut along the screw is disengaged at or before the time the stop is engaged whereby, as compared to prior constructions, the force of the impact against the stop is substantially reduced.

A more detailed object is to achieve the foregoing by providing the shaft with a cylindrical portion which is telescoped by the nut when the latter is in the limit position so that the balls are out of the groove in the shaft and are rolling on the surface of the cylindrical portion when the stop is engaged.

The invention also resides in the novel construction and arrangement of the stop and of the cylindrical portion of the shaft to aid the balls in re-entering the groove on the shaft when the nut is traversed in the opposite direction and away from the stop.

DETAILED DESCRIPTION OF THE PREFERRED EMBODIMENT

Figure 1:
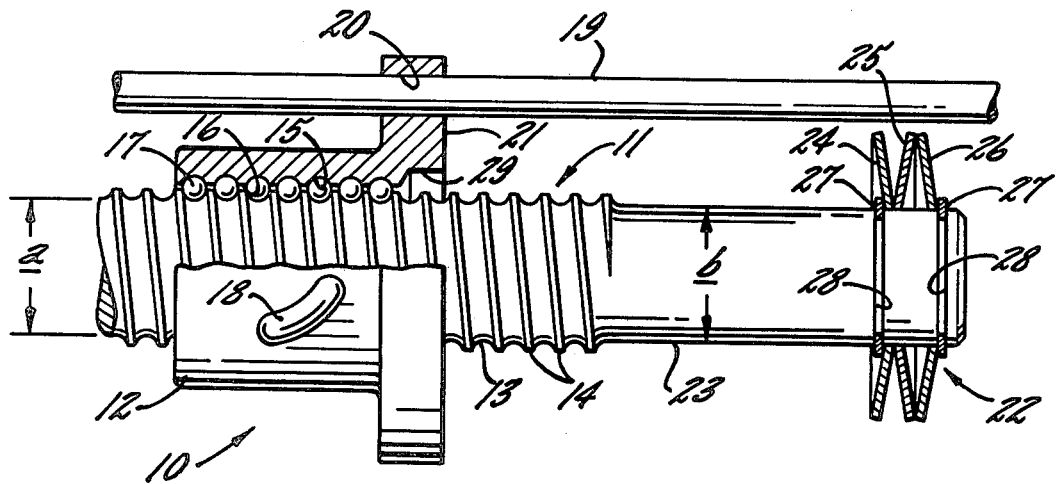
FIG. 1 is a fragmentary side view of a ball screw and nut assembly embodying my invention, parts being broken away and shown in section.

As shown in the drawings for purposes of illustration, the invention is embodied in a ball screw and nut assembly which includes an elongated shaft 10 having a threaded portion 11 and a nut 12 normally telescoped over the threaded portion. The latter is formed with a helical groove 13 which is generally semi-circular in cross section and which has a selected or predetermined root diameter a and lands 14 are formed between the adjacent convolutions of the groove. The nut 12 is formed internally with a similar groove 15 and lands 16 which oppose groove 13 and the lands 14 whereby the grooves 13 and 15 cooperate to form a helical channel. One or more endless trains of balls 17 are disposed in the channel and couple the nut 12 and the shaft 10 so that the two may rotate relative to each other. The nut includes one or more cross-over members 18 which are conventional in construction and serve the usual purpose of deflecting the balls 17 back over a land 16 once they have reached the end of the train.

Figure 2:
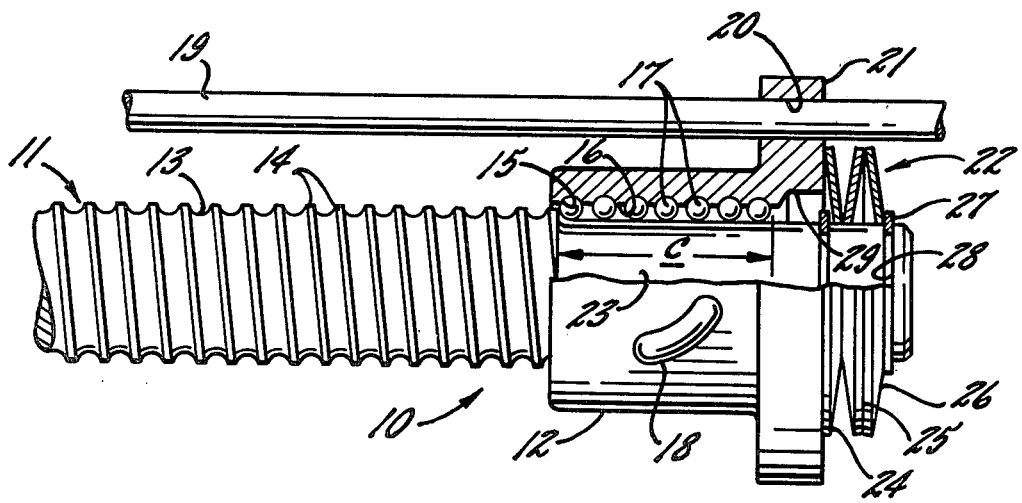
FIG. 2 is a view similar to FIG. 1 but shows the parts in a moved position.

In using such an assembly, the nut 12 and the shaft 10 are turned relatively to each other and thus, through the actions of the balls 17 in the grooves 13 and 15, the nut moves axially relative to the screw. In many applications, the shaft is turned while being held against axial movement and the nut is free to move axially but is held against turning as by a stationary rod 19 paralleling the shaft and extending through a hole 20 in a flange 21 on the nut. The present invention particularly relates to an assembly incorporating a means 22 coacting between the shaft and nut to limit the axial travel of the nut to a predetermined position such as the position shown in FIG. 2 when the shaft is turned in the direction to traverse the nut toward that position. Herein, the stop means 22 is mounted on the shaft 10 and is engaged by tne nut 12 when the latter is in the limit position.

Because of the kinetic energy of the nut 12 and any parts moved by the nut, the nut may strike the stop 22 with an undesirably heavy impact. The present invention contemplates a novel arrangement whereby the force of impact is reduced so that it does not result in a detrimental effect and, to this end, the shaft 10 is provided with a cylindrical portion 23 which has a diameter b substantially equal to the root diameter a of the grooves 13 and which is located relative to the threaded portion 11 and the stop 22 so that, as the nut comes into engagement with the stop, the balls 17 have left the groove 13 and are rolling on the surface of the cylindrical portion. Thus, when the nut engages the stop, the balls no longer are positively driving the nut in the axial direction and this results in a reduction of the rate of travel of the nut and of the magnitude of the force of impact with which the nut engages the stop 22.

In the present instance, the cylindrical portion 23 of the shaft 10 extends immediately beyond the threaded portion 11 and the stop 22 is mounted on the shaft at the end of the cylindrical portion opposite the threaded portion. The length of the cylindrical portion 23 is at least as long as, and preferably somewhat longer than, the combined length c (FIG. 2) of the trains of balls 17 to insure that all of the balls are out of the groove 13 and the positive axial drive of the nut 12 has been disengaged as the nut moves into engagement with the stop.

To help insure that the balls 17 re-enter the groove 13 when shaft 16 is turned in the reverse direction, the diameter b of the cylindrical portion 23 is made slightly larger than the root diameter a of the groove 13. As a result, the shaft 10 or the nut 12 or the balls 17 or all of them are elastically deformed when the balls roll on the surface of the cylindrical portion 23. Thus, the balls, being forced against this surface, tend more readily to bear against the sides of the grooves 15 in the nut and move the nut toward the threaded portion 11 of the shaft.

In accordance with another aspect of the invention, the stop 22 is resilient so that it cushions the impact of the nut 12 and, also, exerts a force on the nut when the latter is in the limit position whereby this force urges the nut toward threaded portion 11 of the shaft 10 and thus aids the balls 17 in re-entering the groove 13 when the travel of the nut is reversed. Herein, the stop 22 is composed of three Belleville or cup-shaped disc springs 24, 25 and 26 received on the shaft 10 adjacent the outer end of the cylindrical portion 23. The concave sides of the inner and outer springs 24 and 26 face inwardly while the concave side of the center spring 25 faces outwardly and the springs are held in place and in engagement with each other by snap rings 27 received in spaced annular grooves 28 in the shaft. When the nut 12 engages the inner spring 24, all three springs are flexed and the nut stops in the limit position. In this position, the flexing of springs causes them to urge the nut back toward the threaded portion 11 of the shaft 10 so that the balls 17 enter the groove 13 when the direction of rotation of the shaft is reversed. A counterbore 29 of a diameter larger than the snap rings 27 is formed in the outer end of the nut 12 so that a portion of the nut may overtravel the inner snap ring as the nut engages the stop 22.

It will be observed that, with the arrangement described above, the balls 17 have left the groove 13 and the nut 12 no longer is being positively driven along the shaft 10 as the nut engages the stop 22. As a result, the kinetic energy of the nut and any parts carried by it is reduced and, thus, the force of the impact of the nut against the stop is correspondingly reduced. Return of the balls 17 into the groove 13 may be aided by making the diameter b of the cylindrical portion 23 of the shaft slightly larger than the root diameter a of the grooves 13 and also by utilizing a resilient stop 22.

I claim:

1. A ball screw assembly having, in combination, an elongated shaft with a first portion formed with a helical groove having a predetermined root diameter, a nut telescoped on said shaft and normally disposed along said first portion, said nut having an internal helical groove opposing the groove in said shaft whereby the two grooves form a helical channel, an endless train of balls of predetermined axial length disposed in said channel and coupling said nut and said shaft whereby the nut traverses axially relative to the shaft upon relative turning of the nut and the shaft, and stop means acting between said shaft and said nut and operable to limit the movement of the nut at a predetermined position along the shaft, said shaft having a cylindrical portion extending beyond said first portion and being of a diameter substantially equal to said root diameter whereby said balls roll on the surface of said cylindrical portion when said nut is telescoped over the cylindrical portion, said cylindrical portion being at least equal to the axial length of said train and being located relative to said first portion to be telescoped by said nut when the nut is in said predetermined position, the diameter of said cylindrical portion being slightly larger than said root diameter whereby at least portions of the assembly of said shaft and said nut and said balls are elastically deformed when the balls roll onto said cylindrical portion.

2. A ball screw assembly as defined by either claim 1 in which said stop means is resilient and, when said nut is in said predetermined position, urges said nut toward said first portion of said shaft.

3. A ball screw assembly as defined by claim 2 in which said stop means includes at least one cup-shaped disc spring mounted on said shaft coaxially with the latter and disposed at the end of said cylindrical portion opposite said first portion, said spring having a concave side facing toward and engageable by said nut.

4. A ball screw assembly having, in combination, an elongated shaft with a first portion formed with a helical groove having a predetermined root diameter, a nut telescoped on said shaft and normally disposed along said first portion, said nut having an internal helical groove opposing the groove in said shaft whereby the two grooves form a helical channel, an endless train of balls of predetermined axial length disposed in said channel and coupling said nut and said shaft whereby the nut traverses axially relative to the shaft upon relative turning of the nut and the shaft, said shaft having a cylindrical portion extending beyond said first portion and having a length greater than the axial length of said train, said cylindrical portion having a diameter whereby balls roll onto the surface of said cylindrical portion and said nut telescopes the latter when the nut is turned in one direction relative to said shaft, at least portions of the assembly of said shaft and said nut and said balls being elastically deformed when said balls roll onto said cylindrical portion whereby the nut continues to traverse the shaft when the nut is turned in said one direction and the balls reenter the groove in said first portion when the nut is turned in the opposite direction relative to the shaft, and a resilient stop mounted on said shaft and on the end of said cylindrical portion opposite said first portion to be engaged by said nut when the nut telescopes the cylindrical portion thereby to absorb the impact of the nut and to urge the nut back toward said first portion.

5. A ball screw assembly as defined by claim 4 in which said stop includes at least one cup-shaped disc spring mounted on said shaft coaxially therewith and disposed at the end of said cylindrical portion opposite said first portion, said spring having a concave side facing toward and engageable by said nut.

* * * * *